US009077692B1

(12) United States Patent
Burns et al.

(10) Patent No.: US 9,077,692 B1
(45) Date of Patent: *Jul. 7, 2015

(54) BLOCKING UNIDENTIFIED ENCRYPTED COMMUNICATION SESSIONS

(71) Applicant: Juniper Networks, Inc., Sunnyvale, CA (US)

(72) Inventors: Bryan Burns, Portland, OR (US); Vladimir Sukhanov, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/723,187

(22) Filed: Dec. 20, 2012

Related U.S. Application Data

(63) Continuation of application No. 12/339,948, filed on Dec. 19, 2008, now Pat. No. 8,341,724.

(51) Int. Cl.
*H04L 29/06* (2006.01)

(52) U.S. Cl.
CPC .................................. *H04L 63/0428* (2013.01)

(58) Field of Classification Search
CPC .............. H04L 63/0227; H04L 63/145; H04L 63/0236; H04L 63/0245; H04L 63/0263; H04L 63/162; H04L 63/164; H04L 63/166; H04L 63/168
USPC .................. 370/252, 235; 709/224; 713/151; 380/28; 726/12, 13, 22, 23
See application file for complete search history.

(56) References Cited

U.S. PATENT DOCUMENTS

| 7,508,945 | B1 * | 3/2009 | Ferre Herrero | 380/268 |
|---|---|---|---|---|
| 7,778,194 | B1 | 8/2010 | Yung | |
| 8,065,721 | B1 * | 11/2011 | Shah | 726/13 |
| 2002/0129140 | A1 * | 9/2002 | Peled et al. | 709/224 |
| 2006/0123481 | A1 | 6/2006 | Bhatnagar et al. | |
| 2007/0116267 | A1 | 5/2007 | Speirs, II et al. | |
| 2007/0297418 | A1 * | 12/2007 | Lee | 370/395.52 |

(Continued)

OTHER PUBLICATIONS

James McCaffrey, "Randomness in Testing", Sep. 2006, http://msdn.microsoft.com/em-us/magazine/cc163551.aspx.*

(Continued)

*Primary Examiner* — Justin T Darrow
*Assistant Examiner* — Hee Song
(74) *Attorney, Agent, or Firm* — Shumaker & Sieffert, P.A.

(57) ABSTRACT

Techniques are described for blocking unidentified encrypted communication sessions. In one embodiment, a device includes an interface to receive a packet, an application identification module to attempt to identify an application associated with the packet, an encryption detection module to determine whether the packet is encrypted when the application identification module is unable to identify an application associated with the packet, and an attack detection module to determine whether the packet is associated with a network attack, to forward the packet when the packet is not associated with a network attack, and to take a response when the packet is associated with a network attack, wherein the encryption detection module sends a message to the attack detection module that indicates whether the packet is encrypted, wherein when the message indicates that packet is encrypted, the attack detection module determines that the packet is associated with a network attack.

18 Claims, 8 Drawing Sheets

(56) References Cited

U.S. PATENT DOCUMENTS

2008/0077705 A1\* 3/2008 Li et al. .................. 709/236
2009/0116394 A1   5/2009 Varadarajan et al.
2011/0041182 A1   2/2011 Stenfelt

OTHER PUBLICATIONS

James McCaffrey, "Randomness in Testing," Sep. 2006, http://msdn.microsoft.com/en-us/magazine/cc163551.aspx (12 pgs.).

\* cited by examiner

BLOCKING UNIDENTIFIED ENCRYPTED COMMUNICATION SESSIONS

This application is a Continuation of U.S. application Ser. No. 12/339,948, filed Dec. 19, 2008, which is hereby incorporated by reference in its entirety.

TECHNICAL FIELD

This invention relates to computer networks and, more particularly, to network intrusion detection and prevention devices and systems.

BACKGROUND

A computer network typically includes a collection of interconnected computing devices that exchange data and share resources. These devices include, for example, web servers, database servers, file servers, routers, printers, end-user computers and other devices. Each of the variety of devices executes a myriad of different services and communication protocols. Each of the different services and communication protocols exposes the network to different security vulnerabilities.

In certain contexts, such as within a corporate enterprise network, a system administrator or other system owner would like to restrict or limit access to and usage of network resources. For example, the system administrator may wish to prevent network access by an unknown application because the unknown application may be malware, such as a virus, trojan, or other malicious software. The system administrator may also wish to prevent users from using certain applications due to various considerations. For example, the system administrator may wish to block network access to applications such as BitTorrent, Skype, or other "grayware" applications due to consumption of network resources or security concerns with respect to the applications. Therefore, the system administrator may configure a firewall or other network device to block certain applications and protocols.

In order to identify network communications associated with unwanted applications, IDSs or other security systems may analyze packet streams of the network communications and employ behavioral analysis. For example, a security system may perform deep packet inspection and apply patterns to the payloads of the packets in an attempt to identify the source software application. However, developers of applications that are commonly blocked, such as Skype, BitTorrent, and malware such as viruses and trojans, will often employ techniques to circumvent a system administrator's or other user's attempt to block these applications. For example, a virus programmer may code the virus to encrypt all transmissions in accordance with an encryption protocol. For example, the developers may code the application to encrypt an entire payload of a TCP/IP packet, including areas of the packet that would typically be unencrypted. As a result, intrusion detection system (IDS) or other security devices are unable to perform deep packet inspection and often have difficulty identifying the particular type of software application that originated the network communication.

As one example, the Back Orifice protocol depends upon a random number generator that is seeded, i.e. initialized, with a secret key. Both parties to a Back Orifice communication session know the secret key in advance of the communication session, and both parties have the same random number generator. By seeding the random number generator with the same secret key, both parties are able to encrypt data without exchanging a key during the communication session. In this way, the parties seek to avoid detection of any key exchange and session establishment. Moreover, parties to the Back Orifice protocol encrypt all data in the packet, including the Back Orifice application-layer header. Back Orifice uses a 17-byte application-layer header that is encrypted, in addition to the payload, by one party and decrypted by the other party to a communication session.

As another example, various BitTorrent client applications or other peer-to-peer client software applications implement similar encryption schemes in an attempt to avoid detection by security devices. For example, some BitTorrent software clients implement protocol encryption, message stream encryption, or protocol header encryption. Some BitTorrent clients provide an option for users to select between encrypting only the protocol header or the entire packet. To provide encryption, specifically to determine a key for encryption, some BitTorrent clients utilize a distributed hash table (DHT). A DHT includes an infohash, which is the result of a hash function performed on a file. The infohash may be used by each peer of a peer-to-peer file exchange using the BitTorrent protocol such that each peer may mutually generate an encryption key, such as an RC4 encryption key. In this manner, each peer may generate the same encryption key without exchanging the encryption key.

Enterprises may wish to block such applications for a variety of reasons. For example, a system administrator may wish to block the Back Orifice application because a malicious user may intentionally or inadvertently use Back Orifice to install a virus or to take control of a computer or server remotely. As another example, the administrator may wish to block applications that utilize a large amount of bandwidth, such as BitTorrent clients or Skype.

Conventional techniques for identifying software applications associated with encrypted data streams are problematic. For example, a conventional IDS may, for example, attempt to apply behavior analysis to the overall communication session, such as by determining an average size and frequency of data transmission for a certain port or session. If the average size and frequency of data transmission matches known characteristics for a malicious or unwanted application, the IDS may block further communication of that session. However, this method of profiling encrypting communication sessions in an attempt to identify the particular originating software application requires a long series of packet exchanges before detection of the unwanted application. Moreover, this method may fail to identify certain unwanted applications and may trigger false positives for desirable applications.

SUMMARY

In general, techniques are described for discovering and preventing network access or network utilization by software applications that employ encrypted communication. The techniques described herein may be employed by an intrusion detection system (IDS), an intrusion detection and prevention (IDP) device or other security device. An IDP may, in accordance with the techniques herein, monitor network traffic into and out of an enterprise network. The IDP determines whether a communication session is occurring in accordance with a known network protocol. For example, the IDP may identify the application in use for the communication session or the IDP may determine whether the communication session is following a known network protocol.

When the IDP cannot determine the network protocol or the application in use for the communication session, the IDP determines whether packets being exchanged as part of the communication session are encrypted. For example, in one embodiment, the IDP analyzes the randomness of the packet's TCP/IP payload. Where a packet's TCP/IP payload has a high degree of randomness, the IDP determines that the payload is likely encrypted. When the IDP determines that the payload is encrypted, and not as part of an identified encryption protocol, the IDP determines that the communication session is unwanted or malicious. Accordingly, the IDP terminates the communication session and records various elements of the communication session in an activity log.

In one embodiment, a method includes receiving a network packet, using an application-layer header of the packet, determining whether the packet is associated with an identifiable network application, when the packet is not determined to be associated with an identifiable network application, determining whether data in the packet is encrypted by calculating a randomness value of the packet from a payload of the packet that includes the application-layer header and an application-layer payload and determining that the packet is encrypted when the randomness value exceeds a randomness threshold, and, when the data in the packet is determined to be encrypted, executing a programmed response.

In another embodiment, a device includes an interface to receive a packet, an application identification module to attempt to identify an application associated with the packet, an encryption detection module to determine whether the packet is encrypted when the application identification module is unable to identify an application associated with the packet, and an attack detection module to determine whether the packet is associated with a network attack, to forward the packet when the packet is not associated with a network attack, and to take a response when the packet is associated with a network attack, wherein the encryption detection module sends a message to the attack detection module that indicates whether the packet is encrypted, wherein when the message indicates that packet is encrypted, the attack detection module determines that the packet is associated with a network attack.

In another embodiment, a computer-readable medium stores instructions. The computer-readable medium may be a computer-readable storage medium. The instructions cause a programmable processor to receive a network packet, determine whether the packet is associated with a network application using an application-layer header of the packet, determine whether data in the packet is encrypted, when the packet is not determined to be associated with an identifiable network application, by calculating a randomness value of the packet from a payload of the packet that includes the application-layer header and an application-layer payload and determining that the packet is encrypted when the randomness value exceeds a randomness threshold, and, when the data in the packet is determined to be encrypted, execute a response, and, when the data in the packet is determined not to be encrypted, forwarding the packet.

The techniques described herein may provide several advantages. For example, the techniques described herein may permit improved discovery and prevention of undesirable applications participating in a network communication session. These techniques may further permit early discovery of an undesirable application as of a first packet is transmitted by the application after a communication session is established.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
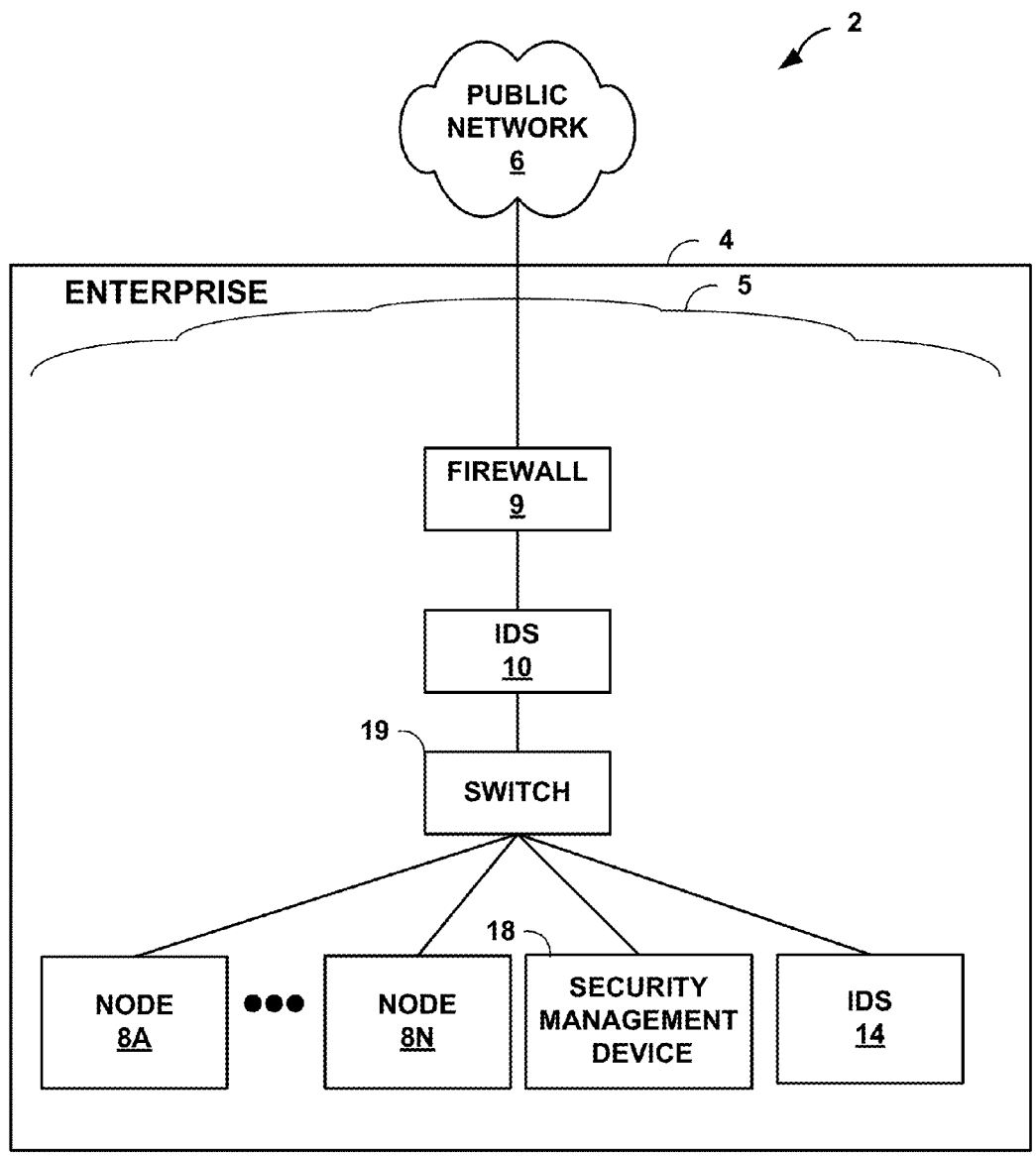
FIG. 1 is a block diagram illustrating an exemplary enterprise computer network in which an intrusion detection system (IDS) detects and prevents unwanted applications and protocols in accordance with the principles of the invention.

FIG. 1 is a block diagram illustrating an exemplary system 2 in which enterprise computer network 4 includes intrusion detection system (IDS) 10 that intercepts packet flows associated with communication sessions and processes the packet flows to filter unwanted or malicious packet flows in accordance with the principles of the invention. In the example embodiment of FIG. 1, IDS 10 is a single network device. Network 4 also includes a private enterprise computing network 5 that is coupled to public network 6, such as the Internet. Public network 6 may include, for example, one or more client computing devices. Firewall 9 protects enterprise network 5 and, in particular, internal computing nodes 8A-8N. Computing nodes 8A-8N (computing nodes 8) represent any private computing device within enterprise network 5, including workstations, file servers, print servers, database servers, printers and other devices.

In one embodiment, IDS 10 attempts to identify applications and protocols for each communication session between computing nodes 8 and other computing devices in public network 6. Exemplary techniques for identifying specific applications and protocols are described in greater detail in U.S. patent application Ser. No. 11/835,923, Burns et al., "Identifying Applications for Intrusion Detection Systems," filed Aug. 8, 2007, assigned to the assignee of the present application, which is hereby incorporated by reference in its entirety.

Although IDS 10 may identify many of the applications and protocols in use for these communication sessions, certain applications, such as certain applications executing on computing nodes 8, may attempt to hide their identities from IDS 10. For example, these applications may encrypt application-layer data in the packets' payloads, such as portions of an application-layer header and/or an application-layer payload. These software applications may also begin communicating using encrypted packet streams without first performing a key exchange when establishing the communication session. The techniques described herein recognize that most legitimate applications that utilize encryption often first perform an identifiable key exchange when establishing a communication session and before beginning encryption of packets associated with that session. The techniques also recognize that illegitimate applications, on the other hand, attempt to hide the key exchange by performing a key exchange during a different communication session, through the use of a hash function performed on the communicated data, by agreeing on a key before initiating the communication session, by exchanging the key in an out-of-band communication, or through some other nonstandard method.

Moreover, the techniques further recognize that many software applications, in an attempt to avoid detection, frequently encrypt all or portions of an application-layer header within each packet as well as application-layer data carried by the packet. For example, these programs may encrypt the entire payload of an Internet protocol suite packet (TCP/IP) packet. The techniques described herein recognize that, generally, a legitimate application following a well-known encryption protocol, such as the secure socket layer (SSL) protocol does not encrypt the application-layer header, the transportation communication protocol (TCP) header, or the Internet protocol (IP) header, but tend to only encrypt application-layer data within the packet. It has been determined that applications attempting to avoid detection may, however, encrypt the application-layer header, as well as the application-layer payload, without encrypting the TCP header or the IP header. Packets encrypted by these applications are generally referred to herein as "fully encrypted," because both the application-layer header and the application-layer payload are encrypted in these packets. IDS 10 attempts to identify those communication sessions in which the packets are fully encrypted. Where IDS 10 identifies a packet with an encrypted header, IDS 10 determines that the packet likely originated from an unwanted application, such as Back Orifice, and blocks the packet and future packets of the communication session.

Where IDS 10 is able to identify the application using a particular communication session, IDS 10 may either permit or prevent the communication session from continuing. For example, a system administrator may configure IDS 10 to explicitly allow all identifiable applications, allow all applications except for a specified list of identifiable applications, or prevent all communications except for communications from a specified list of permitted software applications. In cases where IDS 10 is unable to identify the application, IDS 10 may further inspect characteristics of the data from the communication session to determine whether the data is encrypted. As one example, IDS 10 may identify an encrypted communication session by determining whether the data in the communication session exceeds a randomness threshold. A system administrator may configure IDS 10 to establish or modify the randomness threshold. When the data from the communication session exceeds the randomness threshold, IDS 10 determines that the data is encrypted. Upon determining that the packet flows of the communication session are encrypted, IDS 10 applies the principles described herein to determine whether the communication session is associated with an allowed application or a typically unwanted application. For example, IDS 10 may then determine whether a proper key exchange was initially detected for the communication session and/or whether the communication session contains fully encrypted packets or whether only application-layer data within the packets is encrypted.

IDS 10 may be configurable in a variety of ways. For example, in one embodiment, IDS 10 may permit a communication session that is unencrypted to continue, despite being unable to identify a particular application that is using the communication session. In one embodiment, where IDS 10 determines that a communication session, for which an application cannot be identified, is encrypted, IDS 10 may terminate the communication session. IDS 10 may take other actions as well, such as dropping the packet, blocking future sessions from a computing device that initiated the communication session, or other actions. In one embodiment, where IDS 10 determines that a communication session, for which an application cannot be identified, is encrypted, IDS 10 may further determine whether a key exchange associated with the communication session can be identified; where a key exchange has been identified, IDS 10 may permit the communication session and where a key exchange has not been identified, IDS 10 may terminate the communication session. In one embodiment, IDS 10 may be configured to take any or all of the above actions, in accordance with a user configuration that a user, such as a system administrator, may configure.

In some embodiments, enterprise network 5 includes multiple IDSs 10 and 14 located within different regions (e.g., sub-networks) of enterprise network 5. Security management device 18 may operate as a central device for managing IDSs 10 and 14. Although the example illustrated in FIG. 1 is described in terms of dedicated IDSs 10 and 14, the functionality described herein may be incorporated within other devices, such as firewall 9 or switch 19.

The example embodiment of IDS 10 portrayed by FIG. 1 may provide several advantages. For example, IDS 10 may discover an undesirable application participating in a network communication session with a network device, such as one of nodes 8, of enterprise 5. IDS 10 may also discover the undesirable application as early as the first transmitted packet after a communication session is established, e.g., when the packet is fully encrypted. In this manner, IDS 10 may block the communication session from the undesirable application, and other traffic of the communication session, as early as the first packet after the communication session is established.

Figure 2:
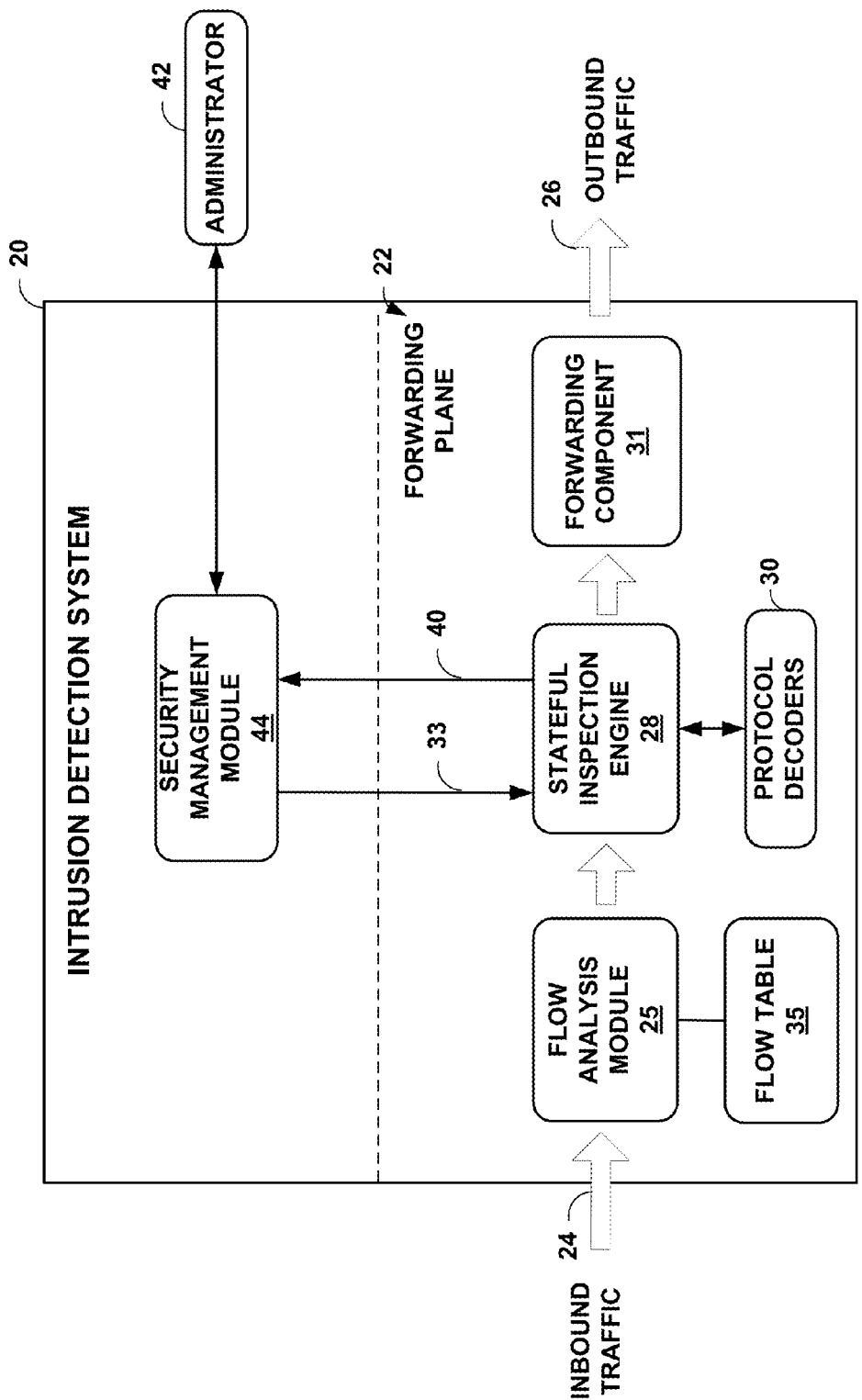
FIG. 2 is a block diagram illustrating an exemplary embodiment of an IDS in further detail.

FIG. 2 is a block diagram illustrating an example embodiment of an IDS 20. In the illustrated example, IDS 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, protocol decoders 30, forwarding component 31 and security management module 44.

Security management module 44 presents a user interface by which administrator 42 configures IDS 20. For example, administrator 42 may configure IDS 20 to monitor particular subnets of the enterprise network. In addition, security management module 44 presents a user interface by which administrator 42 may specify attack definitions 33, which security management module 44 relays to stateful inspection engine 28. In one embodiment, attack definitions 33 may be compound attack definitions.

Security management module 44 may further present a user interface by which administrator 42 may configure IDS 20 to take particular actions when a fully encrypted packet is identified. For example, the user interface may permit the administrator to drop all fully encrypted packets, log details about the communication session associated with the fully encrypted packets, drop the packets only if a key exchange has not been previously identified for the communication session, throttle down the communication session with fully encrypted packets to reduce the bandwidth usage of that communication session, or other actions. The user interface may also enable administrator 42 to configure a randomness threshold that IDS 20 uses to determine whether a packet is encrypted, as described further herein.

Flow analysis module 25 receives inbound traffic 24 and identifies network flows within the traffic. Each network flow represents a flow of packets in one direction within the network traffic and is identified by at least a source address, a destination address and a communication protocol. Flow analysis module 25 may utilize additional information to specify network flows, including source media access control (MAC) address, destination MAC address, source port, and destination port. Other embodiments may use other information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 may identify pairs of packet flows that collectively form a single communication session between a client and server. For example, flow table 35 may designate communication session as pairs of packet flows in opposite directions for flows sharing at least some common network addresses, ports and protocol.

In one embodiment, to determine whether a packet flow is associated with an identifiable application, stateful inspection engine 28 buffers a copy of the packet flow and reassembles the buffered packet flow to form application-layer communications. For example, stateful inspection engine 28 may reconstruct TCP segments into application-layer communications, which represent protocol-specific messages.

Where stateful inspection engine 28 is unable to determine an identity of an application associated with a packet flow, stateful inspection engine 28 performs additional analysis on the packet flow. In one embodiment, for example, stateful inspection engine 28 attempts to determine whether the packet flow is encrypted. When stateful inspection engine 28 determines that the packet flow is encrypted, stateful inspection engine 28 further determines whether characteristics of the communication session indicates that the packet flow is associated with an unwanted software application. Stateful inspection engine 28 may, in one embodiment, determine whether a key exchange has occurred for the communication session when stateful inspection engine 28 identifies an encrypted packet of the communication session. In this embodiment, when stateful inspection engine 28 determines that a key exchange has occurred, stateful inspection engine 28 permits the communication session to continue, but when stateful inspection engine 28 determines that a key exchange has not occurred, stateful inspection engine 28 takes a programmed response, e.g., to block the communication session, block future communication sessions from a peer of the communication session, output an alert, or other actions.

In the event a security risk is detected, stateful inspection engine 28 outputs an alert 40 to security management module 44 for logging and further analysis. In addition, stateful inspection engine 28 may take additional actions, such as dropping the packets associated with the communication session, automatically closing the communication session, or other actions. If no security risk is detected for a given application-layer communication session, stateful inspection engine 28 instructs forwarding component 31 to forward the packet flows between the peers. Forwarding component 31 may, for example, maintain a routing table that stores routes in accordance with a topology of enterprise network 5 for use in forwarding the packet flows.

Figure 3:
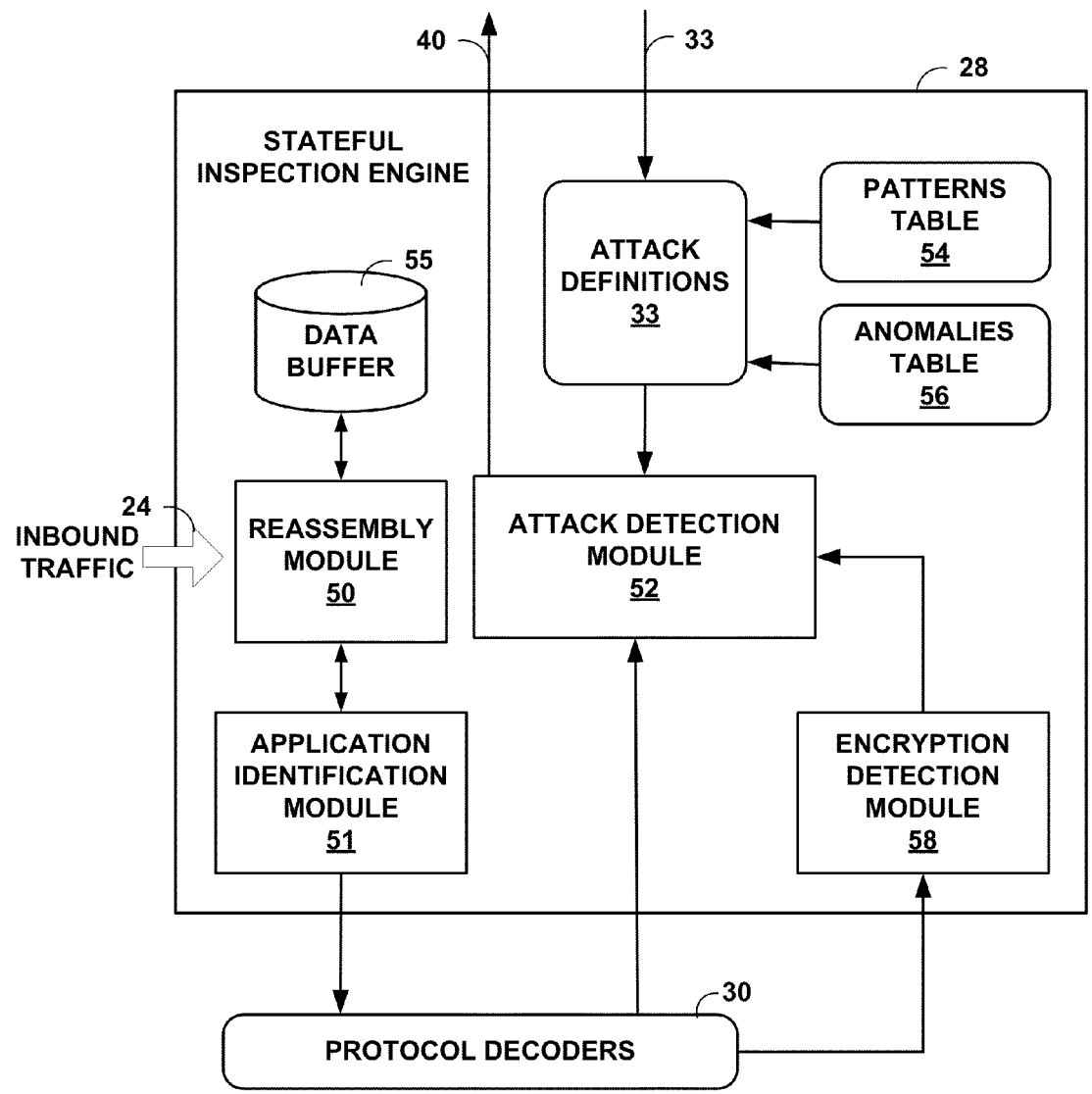
FIG. 3 is a block diagram that illustrates an example embodiment of a stateful inspection engine of the IDS.

FIG. 3 is a block diagram that illustrates an example embodiment of stateful inspection engine 28. In the example embodiment, stateful inspection engine 28 includes reassembly module 50, application identification module 51, and attack detection module 52. In addition, stateful inspection engine 28 includes patterns table 54, data buffer 55, anomalies table 56, and attack definitions 33.

Reassembly module 50 receives inbound network traffic 24 and reassembles application-layer communications from the packet flows. Reassembly module 50 forwards the reassembled application-layer communications to the appropriate protocol decoders 30 for processing.

Stateful inspection engine 28 stores attack definitions 33 received from security management module 44. Attack definitions 33 may be stored, for example, in a computer-readable medium, such as random access memory (RAM). Each of attack definitions 33 specifies a combination of one or more patterns specified within patterns table 54 and one or more protocol-specific anomalies specified within anomalies table 56.

Application identification module 51 attempts to identify an application associated with each of the intercepted communication sessions. In one embodiment, when stateful inspection engine 28 receives a packet as part of a packet flow, reassembly module 50 buffers the packet in data buffer 55. Reassembly module 50 attempts to reconstruct application layer data from the packets in data buffer 55. Application identification module 51 then attempts to identify the application associated with the packets in accordance with this reconstructed data. In other embodiments, application identification module 51 may use other techniques to attempt to identify the application associated with the communication session.

Application identification module 51 sends data from the packets to protocol decoders 30. When application identification module 51 is able to determine the application associated with the communication session, application identification module 51 sends data from the communication session to a corresponding one of protocol decoders 30. When application identification module 51 is not able to identify an application corresponding to the communication session, application identification module 51 sends the data from the communication session to a default protocol decoder of protocol decoders 30.

In any case, protocol decoders 30 receive data of the communication session from application identification module 51 and attempt to identify a network protocol being used by the communication session. Protocol decoders 30 utilize an application-layer header of a packet of the communication session to attempt to identify a protocol being used by the communication session. When the application-layer header is encrypted, however, protocol decoders 30 may not be able to identify the protocol being used by the communication session. Protocol decoders 30 represent a set of one or more protocol-specific software modules. Certain ones of protocol decoders 30 may correspond to a different communication protocol or service. Once protocol decoders 30 have identified a protocol corresponding to the communication session, protocol decoders 30 forward the data from the communication session to attack detection module 52.

In one embodiment, one of protocol decoders 30 corresponds to a default protocol decoder. When application identification module 51 is unable to determine an application corresponding to a communication session, application identification module 51 sends data from that communication session to the default protocol decoder. The default protocol decoder attempts to identify various elements of the communication session that make the communication session appear to conform to a protocol. For example, the default protocol decoder attempts to analyze the bi-directional communications for the communication session to identify a key exchange for cryptography. As another example, the default protocol decoder attempts to identify regularly occurring patterns that correspond to protocol headers in the packets. Other embodiments may utilize other detection algorithms to determine if the communication session is following a protocol, even if the protocol is unknown.

When the default protocol decoder of protocol decoders 30 is able to identify that the communication session is following a protocol, the default protocol decoder forwards data from the communication session to attack detection module 52. When the default protocol decoder of protocol decoders 30 is unable to identify a protocol for the communication session, however, the default protocol decoder sends data of the communication session to encryption detection module 58.

Encryption detection module 58 attempts to determine whether the packets of the communication session are fully encrypted, i.e., that the application-layer header as well as the application-layer payload are encrypted. For example, encryption detection module 58 may extract the payload from a TCP/IP packet, which frequently includes an application-layer packet header (e.g., HTTP header) and application-layer payload. Encryption detection module 58 then analyzes characteristics of the TCP/IP payload to determine whether the payload of the TCP/IP packet is fully encrypted. That is, encryption detection module 58 examines the entire payload of a TCP/IP packet, including a region that would typically be an application-layer header, and compare characteristics of the TCP/IP payload to a randomness threshold to determine if the TCP/IP payload that would normally correspond to the application-layer header as well as the application-layer payload are encrypted.

In one embodiment, administrator 42 (FIG. 2) may configure a randomness threshold of IDS 20 (FIG. 2). In another embodiment, IDS 20 utilizes a randomness threshold specified by a randomness detection algorithm, such as the Wald-Wolfowitz runs test algorithm. Encryption detection module 58 determines a randomness value for a packet of the communication session being examined, i.e., the TCP/IP payload of a packet of the communication session. When the randomness value of a particular TCP/IP payload of the communication session exceeds the randomness threshold, encryption detection module 58 determines that the communication session is encrypted. Accordingly, encryption detection module 58 sends a message to attack detection module 52 that the communication session is being conducted by an undesirable application. Attack detection module 52, therefore, may perform one or more of a variety of actions. For example, attack detection module 52 may terminate the communication session, log the communication session, generate a message for, e.g., administrator 42, or take other actions.

Encryption detection module 58 may implement and execute one or more methods to determine a randomness value. A detailed description of an exemplary one of such algorithms is discussed with respect to FIG. 6. As one example, encryption detection module 58 may implement the Wald-Wolfowitz runs test. Encryption detection module 58 may also apply one or more filters to a packet to determine whether the packet is random. Encryption detection module 58 may use any algorithm that is able to determine a randomness value, and should not be understood to be limited to the Wald-Wolfowitz runs test or filters. Encryption detection module 58 may also provide a user, such as administrator 42, with the ability to apply additional tests for randomness of the data to determine the randomness value, or with the ability to add, remove, or edit the filters.

Figure 4:
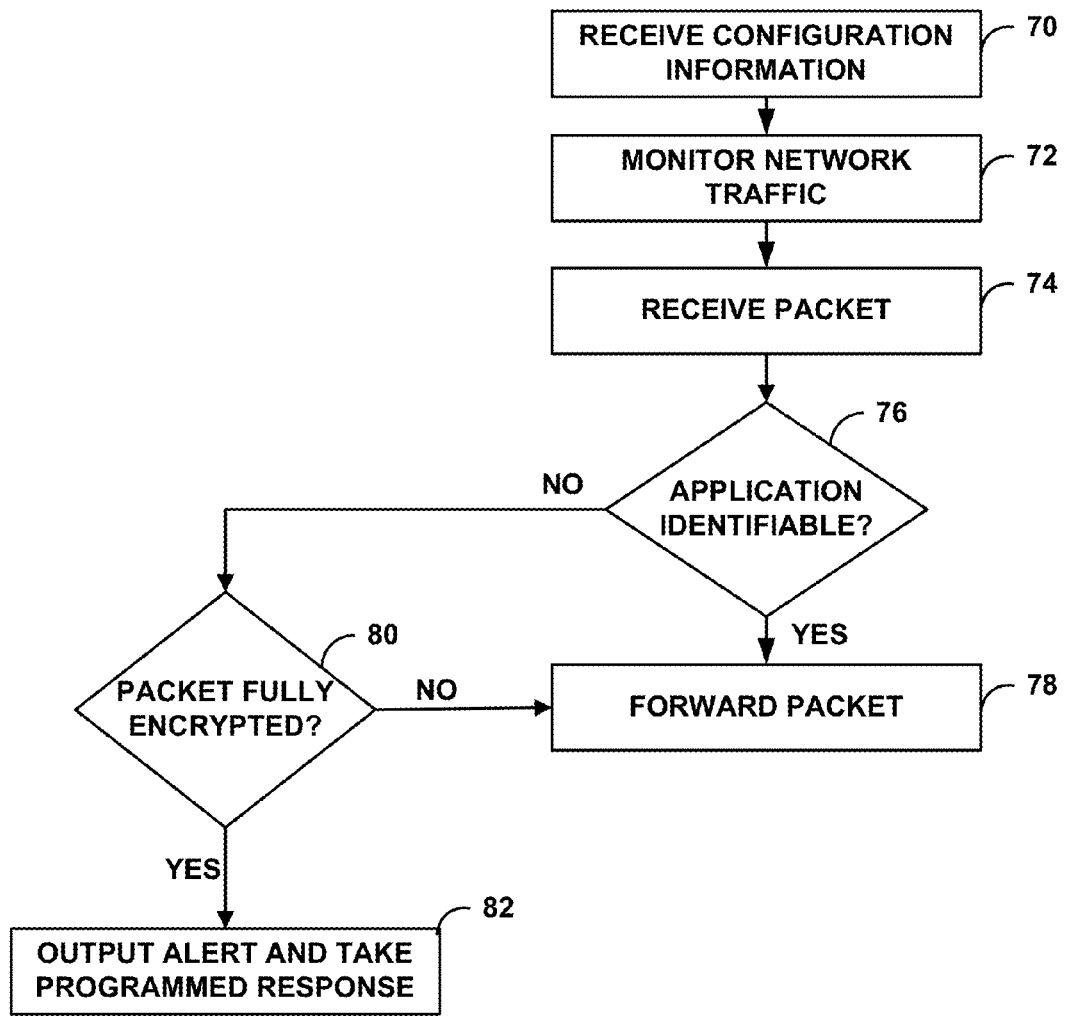
FIG. 4 is a flowchart illustrating an exemplary operation of an IDS in accordance with the techniques described herein.

FIG. 4 is a flowchart illustrating an exemplary operation of an IDS in accordance with the techniques described herein. For exemplary purposes, the flowchart is described in reference to IDS 20 (FIG. 2).

Initially, security management module 44 receives configuration information from administrator 42 and, in response, configures IDS 20 to monitor a network or portions thereof (subnets) of interest (70). During this process, configuration manager 44 presents a user interface by which administrator 42 specifies patterns or other attack definitions 33. For example, administrator 42 may configure IDS 20 to block all packets deemed to be fully encrypted and to log information about the communication session associated with the blocked packets. Administrator 42 may also configure IDS 20 to throttle down (i.e., bandwidth limit) the communication session associated with the packets to minimize the bandwidth used by the communication session. Administrator 42 may also configure IDS 20 to block future communication sessions from either or both of the communicating devices. IDS 20 may additionally include a default configuration that specifies actions IDS 20 should take when IDS 20 detects a fully encrypted packet. IDS 20 may, for example, be programmed to let such packets pass by default, or to block all fully encrypted packets by default.

Once configured, IDS 20 monitors network traffic 24 (72). In some configurations, stateful inspection engine 28 of forwarding plane 22 may receive network traffic and mirror the network traffic for purposes of analysis. Forwarding component 31 seamlessly forwards the original network traffic.

Stateful inspection engine 28 of forwarding plane 22 next receives a packet, e.g. from flow analysis module 25 (74). While stateful inspection engine 28 may receive all packets of a particular communication session, for the purposes of this discussion, it is assumed that this packet is the first packet following the packets used to establish the three-way handshake of TCP/IP. In general, IDS 20 may be capable of identifying certain network attacks as early as with this first packet.

Application identification module 51 attempts to identify an application associated with the received packet (76). For example, application identification module 51 may inspect the packet header to determine the destination port of the packet. In some cases, the destination port is associated with the protocol or application being used for the communication session. For example, port 80 is typically associated with HTTP traffic, while port 22 is typically associated with SSH traffic. Application identification module 51 may also inspect an application-layer header, within a TCP/IP payload of the packet, to identify the application associated with the packet. Application identification module 51 may use any known or future technique to attempt to identify the application associated with the communication session.

When application identification module 51 is able to determine the application associated with the communication session ("YES" branch of 76), application identification module 51 forwards the packet (78). In one embodiment, application identification module 51 may send the packet to protocol decoders 30 to identify the protocol in use for the communication session. In another embodiment, application identification module 51 sends the packet to attack detection module 52 to inspect the packet and to determine whether the packet is associated with a network attack. In yet another embodiment, IDS 20 simply forwards the packet towards its destination in the network.

When application identification module 51 is unable to determine the application associated with the communication, however, ("NO" branch of 76), application identification module 51 sends the packet to encryption detection module 58 to determine whether the packet flow represents an encrypted packet flow. In one embodiment, application identification module 51 may first send the packet to protocol decoders 30. Protocol decoders 30 attempt to determine if the packet resembles a protocol by, for example, looking for a particular pattern of data at particular locations in the packet, such as in the portion of the TCP/IP payload that typically carries an application-layer header.

Encryption detection module 58 inspects the packet when an application and/or protocol cannot otherwise be associated with the packet and the corresponding communication session. Encryption detection module 58 determines whether the packet is fully encrypted (80). That is, encryption detection module 58 examines the packet, including the application-layer header, to determine whether the packet, including the application-layer header, is encrypted. Encryption detection module 58 analyzes the TCP/IP payload of the packet to determine a randomness value of the TCP/IP payload, which includes the application-layer header as well as the application-layer payload. Where the randomness value of the packet exceeds a threshold, which may be predefined or may be configured by an administrator, encryption detection module 58 determines that the packet is encrypted.

When encryption detection module 58 determines that the packet is not fully encrypted ("NO" branch of 80), either because the packet is not encrypted at all or because the packet is part of a valid encryption scheme, for example an encryption scheme that does not encrypt the application-layer header, encryption detection module 58 may forward the packet (78). In one embodiment, IDS 20 may simply forward the packet toward its network destination. In another embodiment, encryption detection module 58 may send the packet to attack detection module 52 to determine whether the packet represents a network attack.

When encryption detection module determines that the packet is fully encrypted, however, ("YES" branch of 80), encryption detection module 58 may output an alert and take a programmed response (82). The response to take may be in accordance with configuration data received from, e.g., administrator 42, at step (70). For example, the programmed response may be to terminate the communication session, to block future communication sessions from the peer that initiated the communication session, or other actions.

Figure 5:
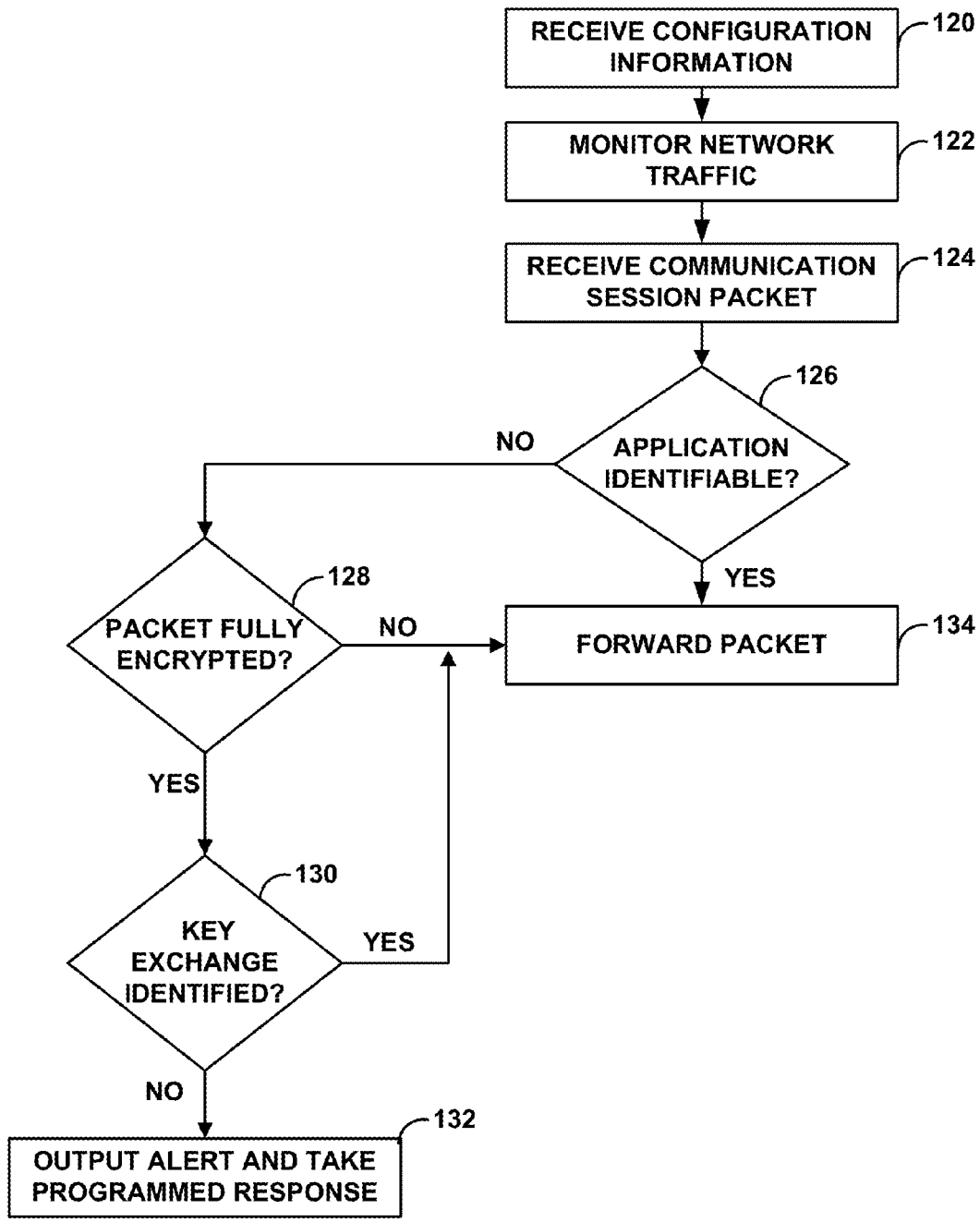
FIG. 5 is a flowchart illustrating another exemplary operation of an IDS in accordance with the techniques described herein.

FIG. 5 is a flowchart illustrating another exemplary operation of an IDS in accordance with the techniques described herein. For exemplary purposes, the flowchart is described in reference to another exemplary embodiment of IDS 20 (FIG. 2).

Initially, security management module 44 receives configuration information from administrator 42 and, in response, configures IDS 20 to monitor a network or portions thereof (subnets) of interest (120). During this process, configuration manager 44 presents a user interface by which administrator 42 specifies patterns or other attack definitions 33. For example, administrator 42 may configure IDS 20 to block all fully encrypted packets and log information about the communication session associated with the packet. Administrator 42 may also configure IDS 20 to throttle down the communication session associated with the packet to minimize the bandwidth used by the communication session. Administrator 42 may also configure IDS 20 to block future communication sessions from either or both of the communicating devices. IDS 20 may additionally include a default configuration that specifies actions IDS 20 should take when IDS 20 detects a fully encrypted packet. IDS 20 may, for example, be programmed to let such packets pass by default, or to block all fully encrypted packets by default.

Once configured, IDS 20 monitors network traffic 24 (122). In some configurations, stateful inspection engine 28 of forwarding plane 22 receives network traffic and mirrors the network traffic for purposes of analysis. Forwarding component 31 seamlessly forwards the original network traffic.

Stateful inspection engine 28 of forwarding plane 22 next receives a packet, e.g., from flow analysis module 25 (124). While stateful inspection engine 28 may receive all packets of a communication session, for the purposes of this discussion, it is assumed that this packet is a packet following the packets used to establish the three-way handshake of TCP/IP.

Application identification module 51 attempts to identify an application associated with the received packet (126). For example, application identification module 51 inspects the packet header to determine the destination port of the packet. In some cases, the destination port is associated with the protocol or application being used for the communication session. For example, port 80 is typically associated with HTTP traffic, while port 22 is typically associated with SSH traffic. Application identification module 51 may also attempt to identify an application-layer header of the packet and use the application-layer header to identify the application associated with the communication session. Application identification module 51 may use any known or future technique to attempt to determine the application associated with the communication session.

When application identification module 51 is able to determine the application associated with the communication session ("YES" branch of 126), application identification module 51 forwards the packet (128). In one embodiment, application identification module 51 may send the packet to protocol decoders 30 to identify the protocol in use for the communication session. In another embodiment, application identification module 51 may send the packet to attack detection module 52 to inspect the packet and to determine whether the packet is associated with a network attack. In yet another embodiment, IDS 20 may simply forward the packet towards its destination in the network.

In one embodiment, application identification module 51 sends the packet to protocol decoders 30. Protocol decoders 30 may attempt to determine if the packet resembles a protocol by, for example, looking for particular data at particular locations in the packet, such as in the application-layer header, and/or by applying pattern matching on portions of the TCP/IP payload. Protocol decoders 30 may further inspect the packet to determine if the packet is part of a key exchange of the communication session. When protocol decoders 30 determine that the packet is part of a key exchange of the communication session, protocol decoders 30 may log this determination in association with the communication session.

As an example, the communication session may be in accordance with the secure socket layer (SSL) protocol. Although application identification module 51 may not be able to determine the specific application associated with the communication, protocol decoders 30 may determine that the communication session is using the SSL protocol. The SSL protocol uses several messages to indicate the use of the SSL protocol after the TCP/IP three-way handshake. A client using the SSL protocol will first send a ClientHello message to a server that includes the highest transportation layer security (TLS) protocol version the client supports, a random number, a cipher suite that the client supports, and compression methods supported by the client. The server will respond with a ServerHello message including a selected TLS protocol version, a random number, a cipher suite, and a compression method, each of which the server may select from the client's ClientHello message. Other standard messages are also exchanged between the client and the server to initiate an SSL session. Protocol decoders 30 may include an SSL decoder that may identify the protocol in use for the communication session as SSL. Moreover, protocol decoders 30 may recognize a packet that includes key exchange information that is exchanged as part of the SSL protocol. For example, protocol decoders 30 may recognize a ClientMasterKey message sent by the client to the server. Protocol decoders 30 may also recognize a ServerVerify message sent by the server to the client. Protocol decoders 30 may recognize any or all of these messages, for example, by inspecting the application layer packet header.

When application identification module 51 is unable to determine the application associated with the communication, however, ("NO" branch of 126), application identification module 51 sends the packet to encryption detection module 58. Encryption detection module 58 inspects the packet when application detection module 51 cannot identify an application associated with the communication session and when protocol decoders 30 cannot identify a protocol associated with the communication session. Encryption detection module 58 attempts to determine whether the packet is fully encrypted (128). Encryption detection module 58 determines a randomness value for the TCP/IP payload of the packet and compares the randomness value to a randomness threshold. Where the randomness value exceeds the randomness threshold, encryption detection module 58 determines that the packet is fully encrypted.

When encryption detection module 58 determines that the packet is not fully encrypted ("NO" branch of 128), encryption detection module 58 may forward the packet. For example, in one embodiment, IDS 20 may simply forward the packet toward its network destination. In another embodiment, encryption detection module 58 may send the packet to attack detection module 52 to determine whether the packet represents a network attack.

When encryption detection module determines that the packet is fully encrypted, however, ("YES" branch of 128), encryption detection module 58 may determine whether a key exchange has already been identified for the communication session (130). As discussed above, protocol decoders 30 may have determined that one or more previously exchanged packet represented a key exchange and logged the fact that a non-hidden (i.e., readily detectable) key exchange has occurred for the communication session. If this has taken place earlier in the communication session, ("YES" branch of 130), in this embodiment encryption detection module 58 determines that the current packet, while potentially fully encrypted, is not associated with an invalid or otherwise unwanted application. Therefore, encryption detection module 58 may forward the packet. For example, in one embodiment, IDS 20 may simply forward the packet toward its network destination. In another embodiment, encryption detection module 58 may send the packet to attack detection module 52 to determine whether the packet represents a network attack.

However, if there has been no earlier key exchange ("NO" branch of 130), encryption detection module may output an alert and take a programmed response (132). The response to take may be in accordance with configuration data received from, e.g., administrator 42, at step (120).

Although this embodiment has been described with respect to fully encrypted packets, the techniques may be applied to packets in which only the portions of the TCP/IP payload that typically correspond to the application-layer payloads have been encrypted. For example, such encrypted packets may be discarded when no key exchange for the communication session has been previously detected and logged.

Figure 6:
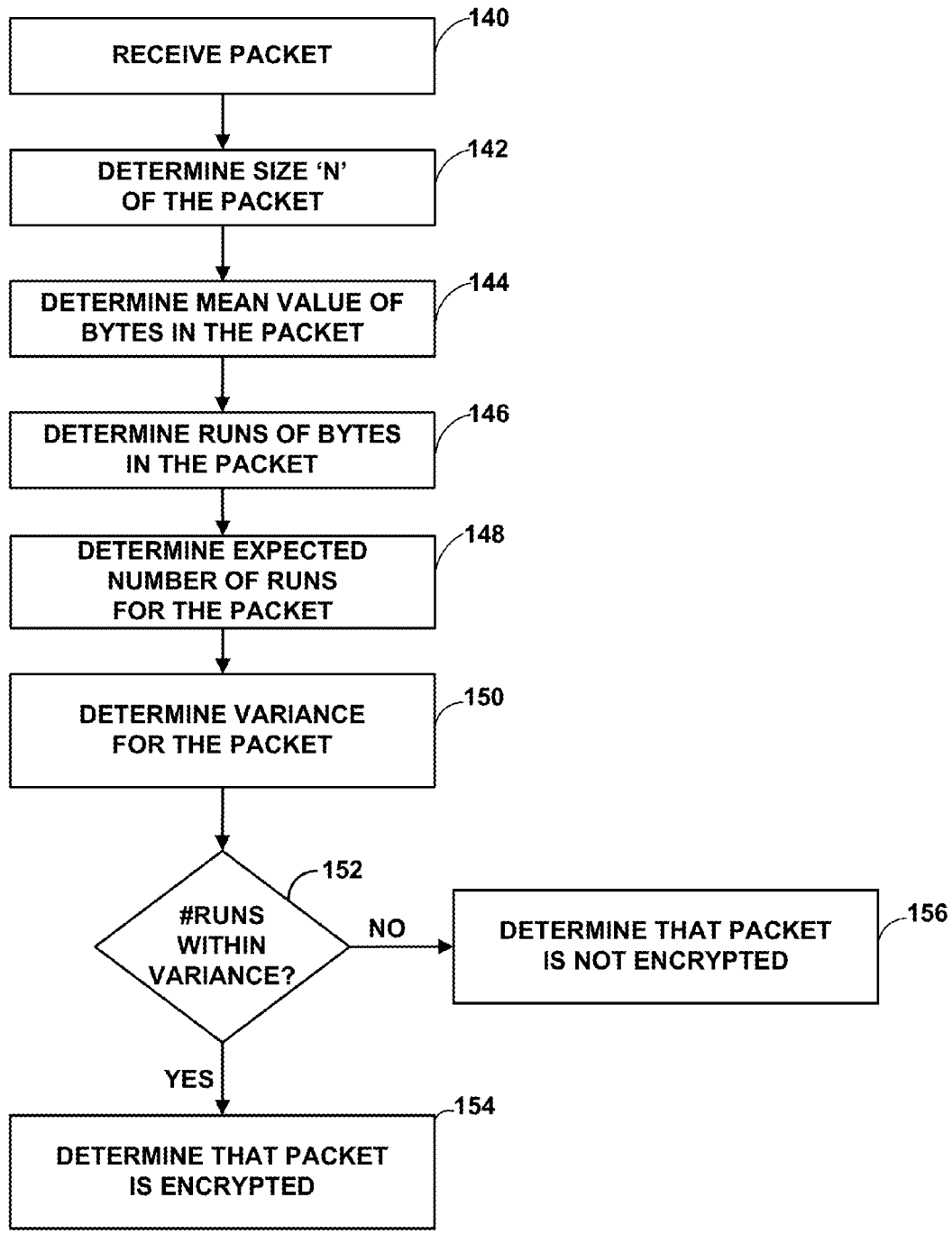
FIG. 6 is a flowchart illustrating an exemplary method to determine whether a packet is fully encrypted.

FIG. 6 is a flowchart illustrating an exemplary method to determine whether a packet is fully encrypted. For exemplary purposes, the method of FIG. 6 is described with respect to encryption detection module 58 of FIG. 3. In the exemplary method depicted in FIG. 6, encryption detection module 58 may apply the Wald-Wolfowitz runs test to a packet to determine whether the data of the packet is random. In this exemplary method, encryption detection module 58 may also apply one or more filters to the packet to determine whether the data of the packet is random. In general, any statistical method for determining randomness or entropy of data in packets may be used to determine whether data of a packet is encrypted. That is, encryption detection module 58 may determine that data of a packet is random by implementing any statistical randomness- or entropy-identifying technique. In general, when encryption detection module 58 determines that data of a packet is random or has high entropy, e.g., by exceeding a randomness or entropy threshold, encryption detection module 58 determines that the packet is encrypted.

Another exemplary method for identifying encrypted packets includes tracking two classes for bytes of a packet and comparing the sizes of the classes. One class may represent bytes with values in the hexadecimal range from 0x00 to 0x7F and another class may represent bytes with values from 0x80 to 0xff. Encryption detection module 58 tracks two counters, one for each of the two classes. When encryption detection module 58 identifies a byte with a value for the first class, encryption detection module 58 increments the counter for the first class, and when encryption detection module 58 identifies a byte with a value for the second class, encryption detection module 58 increments the counter for the second class. Encryption detection module 58 then determines that a packet is random, hence encrypted, when the two counters are relatively equal, i.e., within a certain range of each other.

Another exemplary method for determining whether a packet is encrypted includes identifying repeating patterns of varying lengths, e.g., one byte, two bytes, four bytes, or other within a packet. That is, encryption detection module 58 may determine that a packet is not random when encryption detection module 58 determines that there exist repeating patterns within the packet.

Initially, encryption detection module 58 receives a packet (140). For example, encryption detection module 58 may receive a TCP/IP packet from, e.g., protocol decoders 30. Encryption detection module 58 may then determine the size N of the TCP/IP payload portion or, in another embodiment, just a portion of the TCP/IP payload of the received packet that typically corresponds to an application-layer header (142). In general, the size of the packet's TCP/IP payload refers to the number of bytes in the packet to be analyzed. In one embodiment, encryption detection module 58 may receive the number of bytes in the packet as an argument to a function or as a configurable input from a user.

Encryption detection module 58 next determines the mean of the byte values in the packet for the portion of TCP/IP payload being analyzed (144). Encryption detection module 58 may, for example, add the value of each byte of that portion of the packet in an accumulator variable and divide the total by the total number of bytes N, as determined above, to determine a mean value. Encryption detection module 58 may then determine a number of "runs" of bytes in the packet, where a "run" is a sequence of bytes that are all above or below the determined mean value (146). For example, for each byte, encryption detection module 58 may determine whether the value of the byte is greater than or less than the determined mean of the packet. Encryption detection module 58 may use a data structure, such as an array, to keep track of a comparison of each byte in the packet to the mean value of all bytes in the packet. Where a byte has a value that is greater than the mean, that byte may be assigned a value of "0," in the array. Where a byte has a value that is less than or equal to the mean, the byte may be assigned a value of "1" in the array. Encryption detection module 58 may use other data structures, instead of an array, to track the comparison as well.

In general, a "run" is a sequence of adjacent cells in the array that all have the same value. As a simplified example, an array such as "0001111100110000111" has six runs, three "0" runs and three "1" runs. Encryption detection module 58 determines the total number of runs in the packet by examining each of the cells in the array. For example, encryption detection module 58 may examine each array cell individually to determine whether that cell constitutes a continuation of a run (i.e., has the same value of the previous cell), or whether that bit constitutes a new run (i.e., has the opposite value of the previous cell). Encryption detection module may also determine the number of runs in other ways.

Encryption detection module 58 also determines how many of each cell value, i.e. "0" and "1" occur in the packet. Encryption detection module 58 may make this determination concurrently with determining the number of runs in step (146), or as an additional step. Encryption detection module 58 may, for example, include two counters, an $N_0$ counter to count the number of "0" valued cells and an $N_1$ counter to count the number of "1" valued cells. Because the packet is N bytes in length, and each cell will only have the value "0" or "1", N should equal $N_0+N_1$. In the exemplary string above, N is 19, $N_0$ is 9, and $N_1$ is 10.

Encryption detection module 58 next determines the expected number of runs in a packet with N bytes (148). In accordance with the Wald-Wolfowitz runs test, the number of runs in a sequence should be a random variable. A random variable has two elements, a mean ($\mu$) and a variance ($\sigma^2$). Encryption detection module 58 calculates the mean in accordance with the Wald-Wolfowitz runs test by determining:

$$\mu = \frac{2*N_0*N_1}{N} + 1$$

Encryption detection module 58 uses the values of N, $N_0$, and $N_1$, determined earlier at steps (142), (144), and (146) to determine the mean. In accordance with the Wald-Wolfowitz runs test, this is the mean number of runs in a packet with N bytes. For the example, $\mu=10$.

Encryption detection module 58 also determines the variance ($\sigma^2$) (150). In accordance with the Wald-Wolfowitz runs test, encryption detection module 58 calculates the variance ($\sigma^2$) by determining:

$$\sigma^2 = \frac{(\mu-1)(\mu-2)}{(N-1)}$$

Encryption detection module 58 uses the value of $\mu$, determined earlier at step (148), to determine the variance. This formula is a simplification of the formula prescribed by Wald-Wolfowitz, which is:

$$\sigma^2 = \frac{2*N_0*N_1*(2*N_0*N_1-N)}{N*N*(N-1)}$$

Various embodiments of encryption detection module 58 may use either the prescribed formula or the simplification thereof from Wald-Wolfowitz for determining the variance ($\sigma^2$). In accordance with the Wald-Wolfowitz runs test, this is the variance to the mean number of runs in a packet of size N. In one embodiment, administrator 42 may further configure or refine this equation for determining the variance using security management module 44. For the example bit string above, $\sigma^2=4$.

Encryption detection module 58 next determines whether the actual number of runs in the packet is within the range predicted by the Wald-Wolfowitz runs test, to determine whether the bits in the packet are random (152). In one embodiment, encryption detection module 58 determines the randomness of the data in the packet by determining:

$$|(\#\_Runs(packet)-\mu)/\sigma| \le x$$

That is, encryption detection module 58 compares the absolute value of the difference between the actual number of runs in the packet and the mean number of runs in a packet of size N, as determined by the Wald-Wolfowitz runs test, divided by the variance. If this value is within a certain range (x), then encryption detection module 58 determines that the packet is random. Otherwise, encryption detection module 58 determines that the packet is not random. In one embodiment, a user, such as administrator 42, may configure the value of x. The value of x may be, for example, 2.58. In the above example, the number of actual runs is 6, and the mean number of runs is 10, the difference being 4. If the value of x is 2.58, the example sequence "0001111100110000111" could be determined to be random, because the difference (value 4) divided by the square-root of the variance (2) is less than 2.58.

When encryption detection module 58 determines that data in the portion of the packet being tested qualifies as random ("YES" branch of 152), encryption detection module 58 marks the packet as encrypted (158). When, on the other hand, encryption detection module 58 determines that data in the packet is not random, i.e., below the defined threshold ("NO" branch of 152), encryption detection module 58 determines that the packet is not encrypted (156). In general, a packet from an application following a particular unencrypted protocol has a high amount of runs, which would be outside the number of runs predicted by the Wald-Wolfowitz runs test.

In one embodiment, an administrator, such as administrator 42, may add, edit, or remove filters of encryption detection module 58. A filter instructs encryption detection module 58 to determine that a packet is random or not random based on certain filtering characteristics. The filtering characteristics may include, for example, the number of bytes in the packet, examining bytes in the packet for a certain pattern, determining whether a minimum number of byte values above or below the mean occur, or other characteristics of a random or nonrandom packet. The following pseudocode shows one exemplary embodiment of a function performed by encryption detection module 58 on a packet to determine whether the packet is random or not:

```
/*The Wald-Wolfowitz test wawo_cf( ) function
    returns a Rand_Val of either IS_RANDOM or NOT_
        RANDOM*/
Rand_Val wawo_cf(<packet_bytes>, <number-of-packet-
    bytes>) {
//Filter to determine if the packet exceeds a minimum
    length
if (<number-of-packet-bytes><MIN_LEN)
    return NOT_RANDOM;
//Determine N
```

```
N=min(<number-of-packet-bytes>, MAX_LEN); /*char-
    acters to analyze*/
//Filter data for the sequence of printable characters found
if (len(sequence)>printable_seq_max)
    return NOT_RANDOM;
//Filter data for the sequence of not-printable characters
    found
if (len(sequence)>not-printable_seq_max)
    return NOT_RANDOM;
//Filter data for repeating character groups mapped to the
    same value
/*to catch sequence like (hex):
    41 31 32 00 01 41 31 32 . . . */
if (not_passed)
    return NOT_RANDOM;
//Calculating average value n_averg through N bytes
sum=0;
n_averg=0;
for (i=0; i<N; i++)
    sum=packet_bytes[i];
n_averg=sum/N;
//Mapping N bytes into the array of N elements
//Also count number of elements mapped to 0 as np0
//and elements mapped to 1 as np1
map[N];
np0=0;
np1=0;
for (i=0; i<N; i++)
    if (map[i]>n_averg)
        map[i]=1;
        np1++;
    else
        map[i]=0;
        np0++;
//a "run" is a continuous series of 0's or 1's
//Count number of runs as nruns
nruns=0;
last=map[0];
for (i=1; i<N; i++)
    if (map[i]!=last)
        last=map [i];
        nruns++;
//MIN_SAME_VALUE is a configurable variable
//each type of symbol in the pattern should be greater than
    MIN_SAME_VALUE
//if the packet is random
MIN_SAME_VALUE=8;
if       (np0<MIN_SAME_VALUE          or
    np1<MIN_SAME_VALUE)
    return NOT_RANDOM;
expectedRuns=2*np0*np1/(np0+np1)+1;
varianceNumerator=2*np0*np1*(2*np0*np1-N);
varianceDenominator=N*N*(N-1);
variance=varianceNumerator/varianceDenominator;
expectedRuns=nruns-expectedRuns;
expectedRuns*=expectedRuns;
K=(nruns-expectedRuns)/Math.Sqrt(variance);
//RAND_PARAM is a configurable variable
//if K is within RAND_PARAM, the packet is random
RAND_PARAM=2.580;
if (K>=-RAND_PARAM and K<=RAND_PARAM)
    return IS_RANDOM;
else
    return NOT_RANDOM;
}
```

As is evident from the exemplary pseudocode, encryption detection module 58 may use a combination of the Wald-Wolfowitz runs test and one or more filters to determine whether the contents of a packet are random. Other filters and algorithms can also be used to determine whether a packet is random.

Figure 7A:
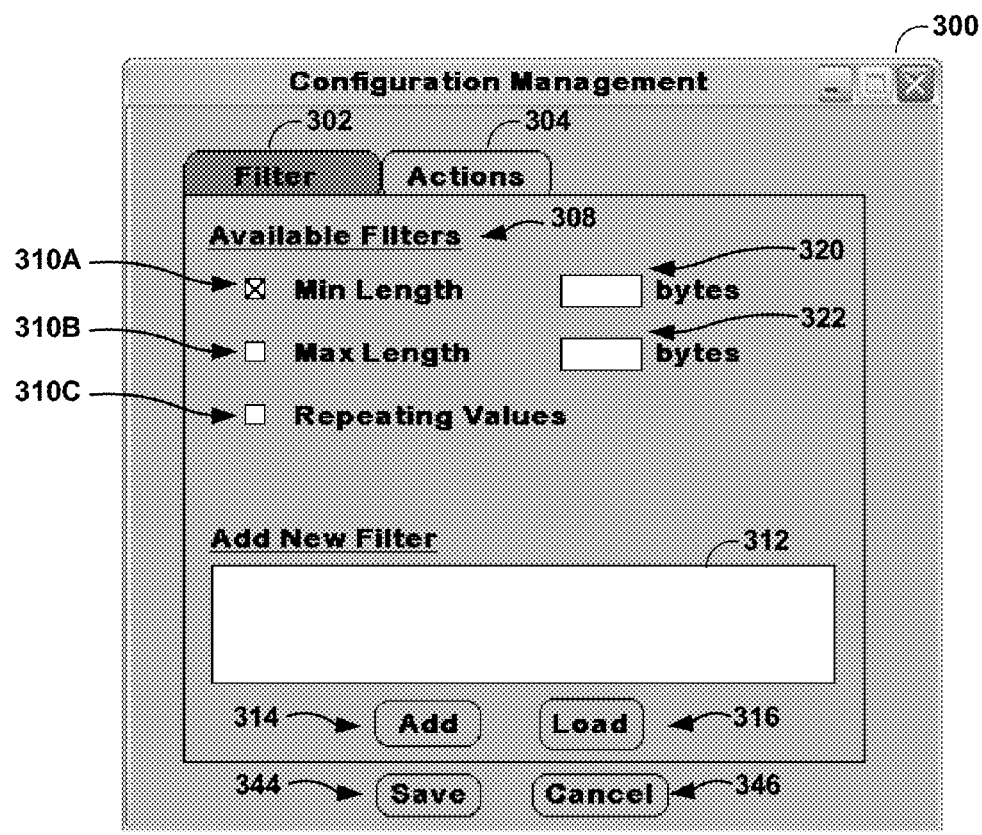
FIGS. 7A-7B are screenshots illustrating an exemplary administrator user interface presented by an exemplary embodiment of a security management module.
Figure 7B:
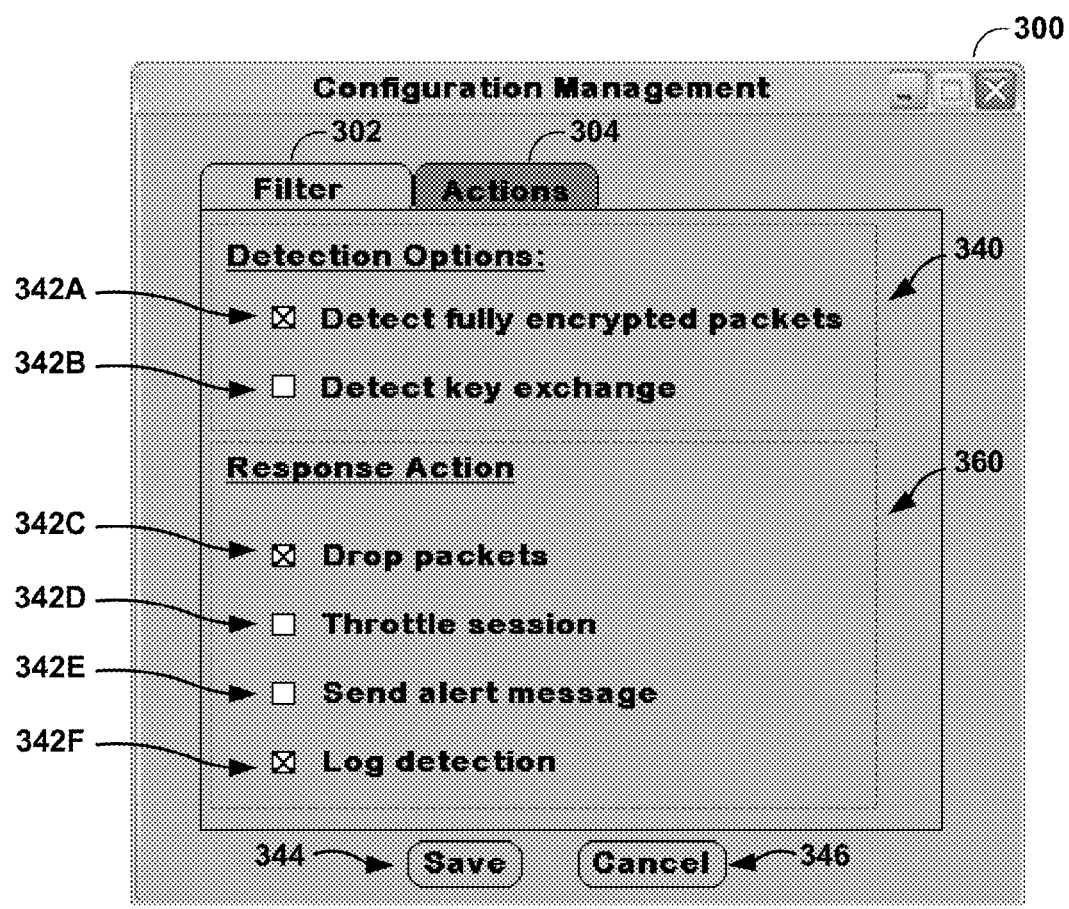

FIGS. 7A-7B are screenshots illustrating one embodiment of administrator user interface 300 presented by an exemplary embodiment of security management module 44. In general, security management module 44 presents administrator user interface 300 that includes two tabs, "Filter" tab 302 and "Actions" tab 304.

FIG. 7A depicts administrator user interface 300 when "Filters" tab 302 is selected, as indicated by highlighting of filters tab 302. Filters tab 302 may be selected either by a user or as a default selection upon initial presentation of administrator user interface 300. Filters tab 302 presents a list of available filters 308 to a user, such as administrator 42. In the example of FIG. 7A, available filters 308 include a minimum length for a packet selectable by check box 310A, a maximum length for a packet selectable by check box 310B, and a filter to determine whether values repeat in the packet selectable by check box 310C.

When administrator 42, for example, selects check box 310A, administrator 42 may also enter a value into field 320. This value may correspond to a minimum length for a packet. When administrator 42 enters a value into field 320 and selects save button 344, administrator user interface 300 may instruct security management module 44 to use a filter to determine whether a packet exceeds a minimum length of the value entered in field 320. For example, administrator 42 may determine that packets that do not exceed a minimum number of bytes are not a concern, so those packets should simply be declared not random.

When administrator 42 selects check box 310B, administrator 42 may also enter a value into field 322. This value may correspond to a maximum length for a packet. When administrator 42 enters a value into field 322 and selects save button 344, administrator user interface 300 may instruct security management module 44 to use a filter to determine whether a packet is less than a maximum length of the value entered in field 322. For example, administrator 42 may determine that packets that exceed a maximum number of bytes are not a concern, so those packets should simply be declared not random.

When administrator 42 selects check box 310A and selects save button 344, administrator user interface 300 instructs security management module 44 to use a filter to determine whether data in a packet has repeating values. Repeated data in a packet may be an indication that the packet is not random, or that the packet is associated with a protocol that should not be blocked. In one embodiment, encryption detection module 58 compares data in the packet to other data in the packet to find a repeating sequence. In one embodiment, encryption detection module 58 stores a sequence of data from each packet in a communication session and determines whether there exists a repeated value in each packet of the communication session; in this case, the repeated value may indicate a standard header of an unknown protocol. In any case, IDS 20 may utilize a repeating values filter.

Administrator 42 may also add new filters to security management module 44. In the example of FIG. 7A, administrator 42 may enter a new filter into field 312 of administrator user interface 300. Upon completing a filter, administrator 42 may select "add" button 314 to add the filter to IDS 20. Alternatively, administrator 42 may select "load" button 316 to retrieve a previously recorded filter from a computer-readable medium, such as a hard drive, a network drive, a flash memory stick, or other location. In this case, administrator 42 may load the filter and save the filter to IDS 20. IDS 20 applies the new filters added by administrator 42, once administrator 42 selects save button 344.

FIG. 7B depicts administrator user interface 300 when "Actions" tab 304 is selected, as indicated by highlighting of actions tab 304. Actions tab 304 presents detection options panel 340 and response actions panel 360 to a user, such as administrator 42. In the example of FIG. 7B, detection options panel 340 presents two options to administrator 42: "Detect fully encrypted packets" and "Detect key exchange." Administrator 42 may select either option using a check box, such as one of check box 342A or check box 342B. Other embodiments may use other selection methods, such as radio buttons, drop down lists, or other selection methods. In one embodiment, when check box 342 is not selected, other options of administrator user interface 300, such as check boxes 343A-343D and the corresponding text within response actions panel 360, may be displayed in a grayed-out format, and administrator user interface 300 may prevent a user from selecting check boxes 343A-343D.

When administrator 42 selects "Detect fully encrypted packets" check box 342A, and then selects save button 344, administrator user interface 300 sends a corresponding message to security management module 44. In particular, when "Detect fully encrypted packets" check box 342A is selected, administrator user interface 300 sends a message to security management module 44 to detect fully encrypted packets, or to operate in a detect fully encrypted packets mode. Accordingly, security management module 44 instructs stateful inspection engine 28 to analyze incoming packets to determine whether those packets are fully encrypted. Stateful inspection engine 28 then begins to determine whether incoming packets are fully encrypted, for example, using the methods disclosed herein, or other methods for detecting encrypted packets.

When administrator 42 selects "Detect key exchange" check box 342B, and then selects save button 344, administrator user interface 300 sends a corresponding message to security management module 44. In particular, when "Detect key exchange" check box 342A is selected, administrator user interface 300 sends a message to security management module 44 to detect key exchanges for monitored communication sessions, or to operate in a detect key exchange mode. Accordingly, security management module 44 instructs stateful inspection engine 28 to analyze incoming packets to determine whether those packets represent a key exchange for their corresponding communication session. Stateful inspection engine 28 then begins to determine whether incoming packets represent a key exchange as part of the communication session. In one embodiment, stateful inspection engine 28 may only determine whether a first set of packets of a communication session represents a key exchange. In one embodiment, stateful inspection engine 28 may only determine whether packets represent a key exchange when those packets correspond to a communication session for which an application and/or a protocol cannot be identified.

In one embodiment, administrator 42 may select both "Detect fully encrypted packets" check box 342A and "Detect key exchange" check box 342B. In other embodiments, administrative user interface 300 may limit administrator 42 to selecting exactly one of "Detect fully encrypted packets" check box 342A and "Detect key exchange" check box 342B. In still other embodiments administrative user interface 300 may limit administrator 42 to selecting only one of "Detect fully encrypted packets" check box 342A and "Detect key exchange" check box 342B or neither of the two.

In the example of FIG. 7B, check box 342A is checked, as marked with an "X" within check box 342A, and check box 342B is unchecked, without the presence of an "X" in check box 342B. Other embodiments may use other visual cues to indicate whether a check box is checked. For example, in one embodiment, check boxes 342A-342F (check boxes 342) may indicate a "checked" status by including a check mark in a checked one of check boxes 342.

Actions tab 304 of administrator user interface 300 also presents response actions panel 360 to a user, such as administrator 42. Response actions panel 360 presents four options to administrator 42: "Drop packets", "Throttle session", "Send alert message", and "Log detection." Administrator 42 may select these options using check boxes 342C-342F, respectively. Other embodiments may include other responses, such as blocking future communication sessions from a computing device that sent a fully encrypted packet, or blocking the communication session in which a fully encrypted packet was identified.

When administrator 42 selects drop packets check box 342C, and then selects save button 344, administrator user interface 300 sends a corresponding message to security management module 44. In particular, when "Drop packets" check box 342C is selected, administrator user interface 300 sends a message to security management module 44 to drop packets associated with the communication session corresponding to options selected in detection options panel 340. For example, when "Detect fully encrypted packets" check box 342A is selected, security management module 44 instructs stateful inspection engine 28 to drop packets associated with a communication session in which a packet that was fully encrypted was detected. As another example, when "Detect key exchange" check box 342B is selected, security management module 44 instructs stateful inspection engine 28 to drop packets associated with a communication session when those packets are fully encrypted but no identifiable key exchange has been detected.

When administrator 42 selects throttle session check box 342D, and then selects save button 344, administrator user interface 300 sends a corresponding message to security management module 44. In particular, when "Throttle session" check box 342E is selected, administrator user interface 300 sends a message to security management module 44 to throttle any communication session corresponding to options selected in detection options panel 340. For example, when "Detect fully encrypted packets" check box 342A is selected, security management module 44 instructs stateful inspection engine 28 to throttle a communication session in which fully encrypted packets were detected. As another example, when "Detect key exchange" check box 342B is selected, security management module 44 instructs stateful inspection engine 28 to throttle communication sessions in which a fully encrypted packet is detected without first detecting a key exchange for that communication session.

When administrator 42 selects send alert message check box 342E, and then selects save button 344, administrator user interface 300 sends a corresponding message to security management module 44. In particular, when "Send alert message" check box 342E is selected, administrator user interface 300 sends a message to security management module 44 to send an alert message to, e.g., administrator 42. Accordingly, when IDS 20 detects a fully encrypted packet, security management module 44 sends an alert to administrator 42. The alert may be any sort of an alert, e.g., a pop-up window, an e-mail, a text message, a page, an audible alert, or any other sort of an alert to inform administrator 42 that IDS 20 has detected, e.g., a fully encrypted packet.

When administrator 42 selects log detection check box 342F, and then selects save button 344, administrator user interface 300 sends a corresponding message to security management module 44. In particular, when "Log detection" check box 342A is selected, administrator user interface 300 sends a message to security management module 44 to make a log of the event that was identified. For example, security management module 44 records the source port, destination port, source IP address, destination IP address, time of discovery, packet size, a copy of the packet, other actions taken in response to the detection, or any other information that administrator 42 may find useful. Security management module 44 may create this log in, e.g., a database, a text file, or any appropriate data structure.

When administrator 42 selects cancel button 346, in one embodiment, check boxes 342 revert to a previous setting, e.g. the setting as of the last time save button 344 was selected. In one embodiment, when administrator 42 selects cancel button 346, check boxes 342 revert to a default setting. When administrator 42 selects cancel button 346, administrator user interface 300 sends a message to security management module 44 to perform in accordance with a setting associated with a selection of cancel button 346. In one embodiment, security management module 344 closes administrative user interface 300, i.e. remove the administrative user interface 300 window from view on, e.g., a computer monitor displaying administrative user interface 300.

Methods described herein may be performed in hardware, software, or any combination thereof within a network device. For example, methods described herein may be performed by an application specific integrated circuit (ASIC) or a general-purpose processor. Methods described herein may also be embodied in a computer readable medium containing instructions. Instructions embedded in a computer readable medium may cause a programmable processor, or other processor, to perform the method, e.g. when the instructions are executed. A computer readable medium may be a computer readable storage medium. Computer readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments of the invention have been described. These and other embodiments are within the scope of the following claims.

The invention claimed is:

1. A method comprising:
    displaying an administrator interface;
    receiving, with the administrator interface, one or more instructions to add, remove, or edit at least one filter;
    receiving a network packet;
    using an application-layer header of the packet, determining whether the packet is associated with an identifiable network application;
    when the packet is determined to be associated with an identifiable network application, forwarding the packet without determining whether the packet is encrypted;
    only when the packet is not determined to be associated with an identifiable network application, determining whether data in the packet is encrypted by applying the at least one filter to the data and calculating a randomness value of the packet from a payload of the packet that includes the application-layer header and an application-layer payload and determining that the packet is encrypted when the randomness value exceeds a randomness threshold;
    when the data in the packet is determined to be encrypted, executing a programmed response; and
    when the data in the packet is determined to not be encrypted, forward the packet.

2. The method of claim 1, wherein determining whether data in the packet is encrypted comprises applying the Wald-Wolfowitz runs test to the payload of the packet that includes the application-layer header and the application-layer payload.

3. The method of claim 2, wherein applying the Wald-Wolfowitz runs test comprises:
    determining a size value for the packet;
    determining a mean value for the bytes in the packet;
    determining a number of bytes with values in excess of the mean in the packet;
    determining a number of bytes with values below and equal to the mean in the packet;
    determining a number of runs of bytes in the packet;
    determining an expected number of runs for a general packet having the size value of the packet, the number of bytes with values in excess of the mean, and the number of bytes with values below and equal to the mean;
    determining a variance for the general packet; and
    determining that the data in the packet is encrypted when the absolute value of the difference between the number of runs in the packet and the expected number of runs for the general packet, divided by the square root of the variance, is within a randomness threshold.

4. The method of claim 3,
    wherein determining an expected number of runs comprises determining that the expected number of runs is equal to two times the number of bytes in excess of the mean times the number of bytes below and equal to the mean divided by the size value, plus one; and
    wherein determining a variance comprises determining that the variance is equal to a quantity, the quantity being the expected number of runs minus one times the expected number of runs minus two, the quantity then being divided by a second quantity, the second quantity being the size value minus one.

5. The method of claim 1, further comprising determining whether the packet represents a key exchange.

6. The method of claim 5, further comprising:
    identifying a key exchange for a communication session for the packet; and
    making a record of the key exchange for the communication session after identifying the key exchange.

7. The method of claim 6, wherein executing a programmed response comprises:
    determining, when the data of the packet is determined to be encrypted, whether a key exchange has been recorded; and
    when a key exchange has not been recorded, dropping the packet, and
    when a key exchange has been recorded, forwarding the packet.

8. The method of claim 1, wherein executing a programmed response comprises dropping the packet.

9. The method of claim 1, wherein executing a programmed response comprises sending an alert.

10. The method of claim 1, further comprising identifying the packet as belonging to a communication session between a server and a client.

11. The method of claim 1, further comprising, when the data in the packet is determined to not be encrypted, forwarding the packet.

12. The method of claim 1, wherein forwarding the packet further comprises:
   determining whether the identifiable network application is a legitimate network application;
   when the identifiable network application is determined to be a legitimate network application, forwarding the packet; and
   when the identifiable network application is determined not to be a legitimate network application, dropping the packet.

13. A network device comprising:
   an interface to receive a packet; and
   one or more hardware-based processing units that implement an application identification module, an encryption detection module, and an attack detection module, and that present an administrator interface and receive, with the administrator interface, one or more instructions to add, remove, or edit at least one filter,
   wherein the application identification module is configured to attempt to identify an application associated with the packet, and wherein when the application identification module is able to identify an application associated with the packet, to cause the network device to forward the packet,
   wherein the encryption detection module is configured to apply the at least one filter to the packet to determine whether the packet is encrypted only when the application identification module is unable to identify an application associated with the packet and not to determine whether the packet is encrypted when the application identification module is able to identify an application associated with the packet, wherein to determine whether the packet is encrypted, the encryption detection module is configured to calculate a randomness value of the packet from a payload of the packet that includes the application-layer header and an application-layer payload and determine that the packet is encrypted when the randomness value exceeds a randomness threshold,
   wherein the attack detection module is configured to determine whether the packet is associated with a network attack, to forward the packet when the packet is not associated with a network attack, and to take a response when the packet is associated with a network attack, and
   wherein the encryption detection module is configured to send a message to the attack detection module that indicates whether the packet is encrypted, wherein when the message indicates that packet is encrypted, the attack detection module determines that the packet is associated with a network attack.

14. The device of claim 13, wherein the encryption detection module implements the Wald-Wolfowitz runs test and applies the Wald-Wolfowitz runs test to the packet to determine whether the packet is encrypted.

15. The device of claim 13, wherein the attack detection module determines whether the packet represents a key exchange, records whether a key exchange has been detected for a communication session, and, when a key exchange has not been detected for a communication session associated with the packet and the encryption detection module has determined that the packet is encrypted, drops the packet, and when a key exchange has been detected for the communication session associated with the packet and the encryption detection module has determined that the packet is encrypted, forwarding the packet.

16. A non-transitory computer-readable medium comprising instructions that cause a programmable processor to:
   display an administrator interface;
   receive, with the administrator interface, one or more instructions to add, remove, or edit at least one filter;
   receive a network packet;
   determine whether the packet is associated with a network application using an application-layer header of the packet;
   when the packet is determined to be associated with an identifiable network application, forward the packet without determining whether the packet is encrypted;
   determine whether data in the packet is encrypted, only when the packet is not determined to be associated with an identifiable network application, by applying the at least one filter to the data and calculating a randomness value of the packet from a payload of the packet that includes the application-layer header and an application-layer payload and determining that the packet is encrypted when the randomness value exceeds a randomness threshold; and
   when the data in the packet is determined to be encrypted, execute a response, and
   when the data in the packet is determined not to be encrypted, forward the packet.

17. The non-transitory computer-readable medium of claim 16, further comprising instructions to apply the Wald-Wolfowitz runs test to the packet to determine whether the data in the packet is encrypted.

18. The non-transitory computer-readable medium of claim 16, further comprising instructions to:
   determine whether a key exchange has occurred for a communication session associated with the packet; and
   when the data in the packet is determined to be encrypted:
      forward the packet when a key exchange has occurred for the communication session, and
      drop the packet when a key exchange has not occurred for the communication session.

* * * * *